United States Patent
Mutsuda et al.

(10) Patent No.: US 9,506,387 B2
(45) Date of Patent: Nov. 29, 2016

(54) ELECTRICALLY HEATED CATALYTIC CONVERTER

(71) Applicants: IBIDEN CO., LTD., Ogaki-shi (JP); TOYOTA JIDOSHA KABUSHIKI KAISHA, Toyota-shi (JP)

(72) Inventors: Fumiyuki Mutsuda, Ibi-gun (JP); Hideyuki Komitsu, Toyota (JP); Shoji Ogimura, Toyota (JP)

(73) Assignees: IBIDEN CO., LTD., Ogaki-Shi (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/922,199

(22) Filed: Oct. 26, 2015

(65) Prior Publication Data

US 2016/0115843 A1   Apr. 28, 2016

(30) Foreign Application Priority Data

Oct. 28, 2014   (JP) ................. 2014-219391

(51) Int. Cl.
*F01N 3/10* (2006.01)
*F01N 3/20* (2006.01)
(Continued)

(52) U.S. Cl.
CPC ............. *F01N 3/2013* (2013.01); *F01N 3/021* (2013.01); *F01N 3/2026* (2013.01); *F01N 3/2066* (2013.01); *F01N 3/2853* (2013.01); *F01N 13/18* (2013.01); *F01N 2510/00* (2013.01)

(58) Field of Classification Search
CPC .... F01N 3/2013; F01N 3/021; F01N 3/2066; F01N 3/2853; F01N 3/2864; F01N 3/2867
USPC .......................................................... 60/300
See application file for complete search history.

(56) References Cited

U.S. PATENT DOCUMENTS

| | | | | |
|---|---|---|---|---|
| 4,335,077 A | * | 6/1982 | Santiago ............... | F01N 3/2853 422/179 |
| 4,344,921 A | * | 8/1982 | Santiago ............... | F01N 3/2853 422/179 |

(Continued)

FOREIGN PATENT DOCUMENTS

| | | |
|---|---|---|
| EP | 2674209 | 12/2013 |
| EP | 2770177 | 8/2014 |

(Continued)

*Primary Examiner* — Patrick Maines
(74) *Attorney, Agent, or Firm* — Mori & Ward, LLP

(57) ABSTRACT

The present invention provides a highly durable, electrically heated catalytic converter including an insulation layer formed on an inner tube, wherein the insulation layer is less susceptible to cracking and peeling even when high thermal stress occurs in the insulation layer at and near the end portion of an inner tube, at upstream of a catalyst carrier. An electrically heated catalytic converter for purifying exhaust gas includes a catalyst carrier supporting a catalyst and configured to generate heat by energization; a case for accommodating the catalyst carrier; and an electrical insulation mat interposed between the catalyst carrier and the case, wherein the case includes an outer tube disposed at the outermost side and an inner tube disposed inside the outer tube; in a cross section upstream of the catalyst carrier taken along a plane including the central axis of the case, the inner tube is curved at least once so as to outwardly project and then obliquely extends toward the central axis of the case, an insulation layer having a thickness of 100 to 200 μm is formed in the range from an end portion of the inner tube to 10% of the length of the inner tube from the end portion of the inner tube to an end of the catalyst carrier, an insulation layer having a thickness of 100 to 400 μm is formed in the range from a point immediately after 10% of the length away from the end portion of the inner tube to 50% of the length of the inner tube from the end portion to the end of the catalyst carrier, and the insulation layer formed in the range from the end portion of the inner tube to 10% of the length is thinner than the insulation layer formed in the range from a point immediately after 10% of the length away from the end portion of the inner tube to 50% of the length.

7 Claims, 3 Drawing Sheets

(51) Int. Cl.
  *F01N 3/021*  (2006.01)
  *F01N 3/28*   (2006.01)
  *F01N 13/18*  (2010.01)

(56) References Cited

U.S. PATENT DOCUMENTS

| | | | | |
|---|---|---|---|---|
| 4,698,213 A | * | 10/1987 | Shimozi | F01N 3/2853 422/179 |
| 6,521,193 B1 | * | 2/2003 | Hijikata | F01N 3/2853 422/177 |
| 6,613,296 B1 | * | 9/2003 | Myers | B01D 53/9454 422/173 |
| 2004/0062690 A1 | * | 4/2004 | Tanaka | F01N 3/2853 422/179 |
| 2011/0033343 A1 | * | 2/2011 | Fernandes, Jr. | C04B 30/02 422/168 |
| 2013/0183205 A1 | | 7/2013 | Yoshioka et al. | |
| 2016/0061081 A1 | * | 3/2016 | Ogimura | F01N 3/2013 422/174 |
| 2016/0115841 A1 | * | 4/2016 | Mutsuda | F01N 3/2013 60/300 |
| 2016/0115842 A1 | * | 4/2016 | Mutsuda | F01N 3/2013 60/320 |

FOREIGN PATENT DOCUMENTS

| | | | | |
|---|---|---|---|---|
| JP | 2013-185573 | | 9/2013 | |
| JP | 2013185573 A | * | 9/2013 | |
| JP | EP 2674209 A1 | * | 12/2013 | F01N 3/2026 |

* cited by examiner (a)

(b)

(a)

(b)

ELECTRICALLY HEATED CATALYTIC CONVERTER

TECHNICAL FIELD

The present invention relates to an electrically heated catalytic converter.

BACKGROUND ART

A catalytic converter supporting a catalyst capable of purifying exhaust gas is disposed in the route of an exhaust pipe in order to purify harmful substances contained in exhaust gas discharged from an engine.

To enhance the efficiency of the catalytic converter to purify harmful substances, the temperate inside the catalytic converter must be maintained at a temperature suitable for catalyst activation (hereinafter also referred to as catalyst activation temperature).

In the case of a vehicle not provided with a means that directly heats a catalyst carrier constituting the catalytic converter, the temperature of exhaust gas is low immediately after the vehicle starts running, so that the temperature inside the catalytic converter does not reach the catalyst activation temperature, making it difficult to effectively prevent discharge of harmful substances.

In addition, in the case of a hybrid vehicle not provided with a means that directly heats the catalyst carrier, the temperature inside the catalytic converter decreases while the motor is operated and the engine is stopped, and in some cases, the temperature inside the catalytic converter is lower than the catalyst activation temperature. Also in this case, it is difficult to effectively prevent discharge of harmful substances.

In order to solve these problems, for example, Patent Literature 1 discloses an invention in which the catalyst carrier itself is used as a heating element that generates heat by energization, and the temperature inside the catalytic converter is increased to or above the temperature of the catalyst activation temperature, if necessary.

CITATION LIST

Patent Literature

Patent Literature 1: JP-A 2013-185573

SUMMARY OF INVENTION

Technical Problem

FIG. 3 is a cross-sectional view schematically showing a catalytic converter disclosed in Patent Literature 1.

As shown in FIG. 3, a catalytic converter 100 includes a catalyst carrier 60 as a heating element, a case 70 for accommodating the catalyst carrier 60, and an insulation mat 80 disposed between the case 70 and the catalyst carrier 60. The case 70 includes an outer tube 71 serving as an external partition wall and an inner tube 74 disposed inside the outer tube 71. The inner tube 74 includes an insulation layer 106 to prevent a short circuit between the inner tube 74 and the catalyst carrier 60.

In addition, the inner tube 74 protrudes toward the central axis of the case 70, and such a protruding portion 74a is exposed to high-temperature heat of exhaust gas. Thus, even when particulate matter (hereinafter referred to as PM) such as soot is attached to the protruding portion 74a, oxidation of PM is accelerated by heat, and PM is removed by combustion. As a result, a short circuit is less likely to occur.

At the same time, however, an end portion of the protruding inner tube 74, which is often exposed to high-temperature exhaust gas discharged from the engine or the like, is heated to a high temperature. In addition, while the temperature of the inner tube 74 upstream of the catalyst carrier 60 decreases from an end portion toward the catalyst carrier, the temperature gradient at and near the end portion is unfortunately larger than that of other portions because the temperature of the end portion is high.

This leads to an increase in thermal stress acting on the end portion and its vicinity, making the insulation layer 106 susceptible to cracking and peeling at and near the end portion of the inner tube.

The present invention is made to solve such problems. An object of the present invention is to provide a highly durable, electrically heated catalytic converter including an insulation layer formed on an inner tube, wherein the insulation layer is less susceptible to cracking and peeling even when high thermal stress occurs in the insulation layer at and near an end portion of an inner tube, at upstream of a catalyst carrier.

Solution to Problem

In order to achieve the above object, the present invention provides an electrically heated catalytic converter for purifying exhaust gas, the electrically heated catalytic converter including a catalyst carrier supporting a catalyst and configured to generate heat by energization; a case for accommodating the catalyst carrier; and an electrical insulation mat interposed between the catalyst carrier and the case, wherein the case includes an outer tube disposed at the outermost side and an inner tube disposed inside the outer tube; in a cross section upstream of the catalyst carrier taken along a plane including the central axis of the case, the inner tube is curved at least once so as to outwardly project and then obliquely extends toward the central axis of the case, an insulation layer having a thickness of 100 to 200 μm is formed in the range from an end portion of the inner tube to 10% of the length of the inner tube from the end portion of the inner tube to an end of the catalyst carrier, an insulation layer having a thickness of 100 to 400 μm is formed in the range from a point immediately after 10% of the length away from the end portion of the inner tube to 50% of the length of the inner tube from the end portion to the end of the catalyst carrier, and the insulation layer formed in the range from the end portion of the inner tube to 10% of the length is thinner than the insulation layer formed in the range from a point immediately after 10% of the length away from the end portion of the inner tube to 50% of the length.

The length of the inner tube is determined by placing a string-like member inside the inner tube along the shape of the inner tube and measuring the length of the string with a ruler. The string-like member can also be used to determine a specific range from the distal end of the inner tube.

In the electrically heated catalytic converter, the end portion of the inner tube is heated to a high temperature, which results in a large temperature gradient in the inner tube in the range from the end portion of the inner tube to 10% of the length of the inner portion from the end portion of the inner tube to the end of the catalyst carrier (hereinafter, this range may also be referred to as "first end region"). The temperature gradient causes high thermal stress in the insulation layer formed on the first end region. Yet, it is possible to alleviate the stress in the first end region so as to alleviate the thermal stress in the insulation layer by making the insulation layer formed on the high-temperature first end region thinner than the insulation layer formed in the range from a point immediately after 10% of the length away from the end portion of the inner tube to 50% of the length (hereinafter, this range may also be referred to as "second end region"). In addition, it is possible to minimize the occurrence of stress by making the insulation layer in the first end region as thin as possible (100 to 200 μm) without impairing insulation, thus preventing cracking and peeling in the insulation layer.

Further, in the second end region (the range from a point immediately after 10% of the length away from the end portion of the inner tube to 50% of the length) where the insulation layer having a thickness of 100 to 400 μm which is thicker than the insulation layer in the first end region is formed, the temperature gradient is smaller than that in the first end region. Thus, even if high thermal stress occurs in the second end region due to the temperature gradient, the insulation layer will be less susceptible to cracking and peeling.

Thus, the electrically heated catalytic converter of the present invention having the above structure is a highly durable, electrically heated catalytic converter without problems such as a short circuit between the inner tube and the catalyst carrier.

In the electrically heated catalytic converter of the present invention, preferably, the insulation layer is formed from an amorphous inorganic material.

In the electrically heated catalytic converter, if an amorphous inorganic material is used to form the insulation layer, it is possible to relatively easily form an insulation layer having a uniform thickness by applying a raw material composition containing a powder of the amorphous inorganic material and the like as raw materials and then melting the raw material composition by heat.

In the electrically heated catalytic converter of the present invention, preferably, the insulation layer further contains a crystalline inorganic material.

In the electrically heated catalytic converter, if the insulation layer contains a crystalline inorganic material having heat resistance, it is possible to improve the heat resistance of the insulation layer and to mechanically reinforce the insulation layer.

In the electrically heated catalytic converter of the present invention, preferably, the amorphous inorganic material is formed of low softening point glass having a softening point of 300° C. to 1000° C.

In the electrically heated catalytic converter, if the amorphous inorganic material is formed of low softening point glass having a softening point of 300° C. to 1000° C., it is possible to relatively easily form the insulation layer by applying the raw material composition containing the low softening point glass to the inner tube and then melting the raw material composition by heat.

If the softening point of the low softening point glass is below 300° C., a layer to be turned into the insulation layer will easily flow due to melting or the like during heat treatment because the softening point is too low, making it difficult to form a layer having a uniform thickness. In contrast, if the softening point of the low softening point glass is above 1000° C., the temperature setting for heat treatment must be very high. Thus, the mechanical characteristics of the inner tube may be degraded by heat.

In the electrically heated catalytic converter of the present invention, preferably, the low softening point glass includes at least one of barium glass, boron glass, strontium glass, alumina silicate glass, soda-zinc glass, and soda-barium glass.

In the electrically heated catalytic converter of the present invention, preferably, the crystalline inorganic material includes at least one of calcia, magnesia, ceria, alumina, and an oxide of a transition metal.

In the electrically heated catalytic converter, if the insulation layer contains at least one of calcia, magnesia, ceria, alumina, and an oxide of a transition metal which are heat resistant, it is possible to improve the heat resistance and the mechanical characteristics of the insulation layer.

In the electrically heated catalytic converter of the present invention, preferably, a portion of the surface of the inner tube where the insulation layer is to be formed is roughened.

In the electrically heated catalytic converter, roughening the portion of the surface of the inner tube can increase the surface area of the inner tube and improve adhesion between the insulation layer and the inner tube, thus making it possible to form an insulation layer that is less susceptible to peeling even when exposed to temperature changes or the like.

DESCRIPTION OF EMBODIMENTS

Figure 1:
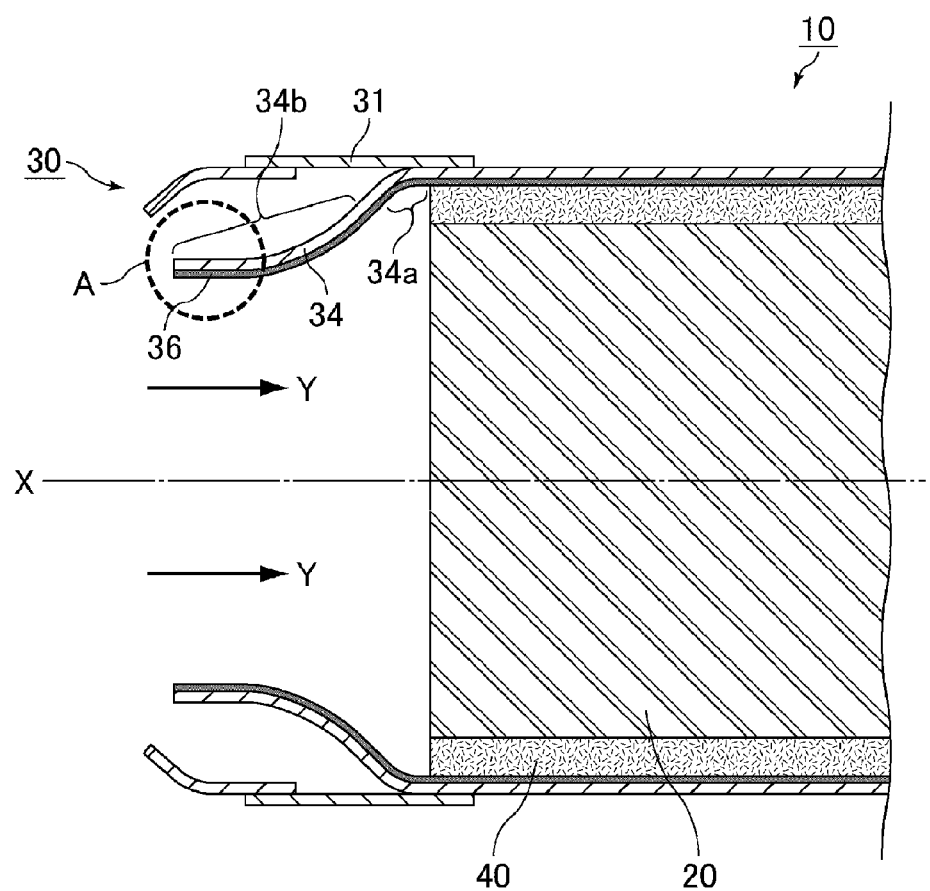
FIG. 1(a) is a cross-sectional view schematically showing an example of the electrically heated catalytic converter according to the present invention.
FIG. 1(b) is a cross-sectional view showing a region A at an end portion of an inner tube constituting the electrically heated catalytic converter.
Figure 1:
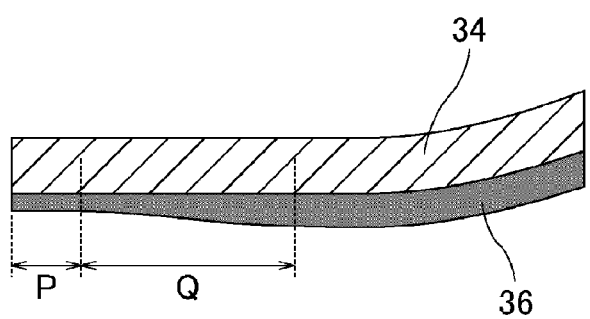

The present invention is described in detail below. The present invention is not limited to the following description, and may be appropriately modified without departing from the gist of the present invention.

The electrically heated catalytic converter of the present invention is described below.

The electrically heated catalytic converter of the present invention is an electrically heated catalytic converter for purifying exhaust gas, the electrically heated catalytic converter including a catalyst carrier supporting a catalyst and configured to generate heat by energization; a case for accommodating the catalyst carrier; and an electrical insulation mat interposed between the catalyst carrier and the case, wherein the case includes an outer tube disposed at the outermost side and an inner tube disposed inside the outer tube; in a cross section upstream of the catalyst carrier taken along a plane including the central axis of the case, the inner tube is curved at least once so as to outwardly project and then obliquely extends toward the central axis of the case, an insulation layer having a thickness of 100 to 200 μm is formed in the range from an end portion of the inner tube to 10% of the length of the inner tube from the end portion of the inner tube to an end of the catalyst carrier, an insulation layer having a thickness of 100 to 400 μm is formed in the range from a point immediately after 10% of the length away from the end portion of the inner tube to 50% of the length of the inner tube from the end portion to the end of the catalyst carrier, and the insulation layer formed in the range from the end portion of the inner tube to 10% of the length is thinner than the insulation layer formed in the range from a point immediately after 10% of the length away from the end portion of the inner tube to 50% of the length.

FIG. 1(a) is a cross-sectional view schematically showing an example of the electrically heated catalytic converter according to the present invention. FIG. 1(b) is a cross-sectional view showing a region A at the end portion of the inner tube constituting the electrically heated catalytic converter.

An electrically heated catalytic converter 10 shown in FIG. 1(a) is provided to an exhaust pipe of an internal combustion engine mounted in a vehicle. The internal combustion engine may be a diesel engine or a gasoline engine. The electrically heated catalytic converter may also be used in a vehicle that employs a hybrid system equipped with an electric motor.

FIG. 1(a) shows a vertical cross-sectional view of the electrically heated catalytic converter 10 taken along a central axis X thereof. FIG. 1(a) shows a catalyst carrier 20 only in the upstream side of the flow of exhaust gas closer to the engine.

As shown in FIG. 1(a), the electrically heated catalytic converter 10 according to the present invention includes a catalyst carrier 20 supporting a catalyst and configured to generate heat by energization, a case 30 for accommodating the catalyst carrier 20, and an electrical insulation mat 40 interposed between the catalyst carrier 20 and the case 30.

The case 30 has a cylindrical shape having a central axis X as the center, and includes an outer tube 31 disposed at the outermost side and an inner tube 34 disposed inside the outer tube 31.

In the cross-sectional view of FIG. 1(a), the inner tube 34 includes a first curved portion 34a and a second curved portion 34b, which are sequentially formed starting from the side close to the catalyst carrier 20. The first curved portion 34a is curved so as to outwardly project, and the second curved portion 34b is curved in the direction opposite to the curvature of the first curved portion 34a so as to project toward the central axis. The second curved portion 34b has a curvature radius larger than that of the first curved portion 34a, and an insulation layer 36 is formed inside the inner tube 34.

As described above, the inner tube 34 is disposed inside the outer tube 31, thus forming a double pipe. The radius of the inner tube 34 decreases toward the upstream side closer to the engine, so that gas that does not flow much will be present between the outer tube 31 and the inner tube 34. As a result, heat transfer from the inner tube 34 to the outer tube 31 can be suppressed, increasing the temperature of the inner tube 34. Thus, even when PM is attached to the inner tube 34, oxidation of PM is accelerated, allowing PM to be easily removed. In order to provide insulation, the insulation layer 36 is formed at least inside the inner tube 34. In order to more reliably provide insulation, the insulation layer 36 may be formed both inside and outside the inner tube 34. It is more preferred that the insulation layer 36 is further provided inside the outer tube 31.

However, the end portion of the inner tube 34 is often exposed to high temperature exhaust gas, and the temperature of the end portion becomes higher than that of other portions. This results in a large temperature gradient in a first end region P (i.e., a region in the range from the end portion of the inner tube to 10% of the length of the inner tube from the end portion of the inner tube to the end of the catalyst carrier), and a second end region Q (i.e., a region in the range from a point immediately after 10% of the length away from the end portion of the inner tube to 50% of the length of the inner tube from the end portion of the inner tube to the end of the catalyst carrier) (see FIG. 1(b)).

Thus, as shown in FIG. 1(b), the insulation layer 36 having a thickness of 100 to 200 μm is formed on the first end region P, and the insulation layer 36 having a thickness of 100 to 400 μm which is thicker than the insulation layer 36 in the first end region P is formed on the second end region Q to prevent cracking and peeling in the insulation layer.

If the thickness of the insulation layer 36 of the first end region P is less than 100 μm, the insulation layer 36 is too thin to provide sufficient insulation. In contrast, if the thickness of the insulation layer 36 is more than 200 μm, the insulation layer 36 will easily have a large temperature difference and will be susceptible to cracking and the like.

If the thickness of the insulation layer 36 of the second end region Q is less than 100 μm, the insulation layer 36 is too thin to provide sufficient insulation. In contrast, if the thickness of the insulation layer 36 is more than 400 μm, the insulation layer 36 will easily have a large temperature difference and will be susceptible to cracking and the like.

The thickness of the insulation layer 36 in regions other than the first end region P and the second end region Q is not particularly limited, but is preferably greater than the thickness of the insulation layer 36 in the second end region Q. The thickness of 100 to 400 μm is more preferred.

Examples of materials of the case 30 (the outer tube 31 and the inner tube 34) constituting the electrically heated catalytic converter 10 include metals such as stainless steel, steel, iron, and copper, and nickel alloys such as Inconel, Hastelloy, and Invar. In order to improve adhesion between the insulation layer 36 and the inner tube 34 constituting the case 30, a portion of the inner tube 34 where the insulation layer 36 is to be formed may be roughened by sandblasting treatment or with a chemical agent.

The surface roughness $Rz_{JIS}$ of the surface of the inner tube 34, which is obtained by the roughening treatment, is preferably 1.5 to 20 μm. The surface roughness $Rz_{JIS}$ of the roughened surface is a 10-spot average of roughness as defined in JIS B 0601 (2001). The measurement distance is 10 mm.

If the surface roughness $Rz_{JIS}$ of the roughened surface of the inner tube 34 is less than 1.5 μm, it will be difficult to provide sufficient adhesion between the inner tube 34 and the insulation layer 36 due to the small surface area of the inner tube 34. In contrast, if the surface roughness $Rz_{JIS}$ of the roughened surface of the inner tube 34 is more than 20 μm, it will be difficult to form the insulation layer 36 on the surface of the inner tube 34. Presumably, this is because if the surface roughness $Rz_{JIS}$ of the roughened surface of the inner tube 34 is too large, slurry (a raw material composition for the insulation layer) will not flow into depressions of the irregularities formed on the surface of the inner tube 34, thus forming voids in these depressions.

The surface roughness $Rz_{JIS}$ of the roughened surface of the inner tube can be measured using Handy Surf E-35B (Tokyo Seimitsu Co., Ltd.) in accordance with JIS B 0601 (2001), with a measurement distance of 10 mm.

In the electrically heated catalytic converter 10 shown in FIGS. 1(a) and 1(b), the insulation layer 36 is formed inside the inner tube 34. Yet, as described above, the insulation layer 36 may be formed entirely both inside and outside the inner tube 34.

In the electrically heated catalytic converter 10 shown in FIGS. 1(*a*) and 1(*b*), the insulation layer 36 formed inside the inner tube 34 is formed from an amorphous inorganic material, or is formed from an amorphous inorganic material and particles of a crystalline inorganic material dispersed inside a layer formed from the amorphous inorganic material.

Preferably, the amorphous inorganic material constituting the insulation layer 36 is formed of low softening point glass having a softening point of 300° C. to 1000° C.

In the electrically heated catalytic converter 10 of the present invention, in the case where an amorphous inorganic material is formed of low softening point glass having a softening point of 300° C. to 1000° C., the insulation layer 36 can be relatively easily formed by applying a raw material composition containing the low softening point glass to the inner tube 34 and then melting the raw material composition by heat.

If the softening point of the low softening point glass is below 300° C., a layer to be converted into the insulation layer 36 will easily flow due to melting or the like during heat treatment because the softening point is too low, making it difficult to form a layer having a uniform thickness. In contrast, if the softening point of the low softening point glass is above 1000° C., the temperature setting for heat treatment must be very high. Thus, the mechanical characteristics of the inner tube 34 may be degraded by heat.

Preferably, the low softening point glass includes at least one of barium glass, boron glass, strontium glass, alumina silicate glass, soda-zinc glass, and soda-barium glass. These kinds of glass may be used alone or in mixture of two or more thereof.

The crystalline inorganic material that may be contained in the insulation layer 36 includes at least one of calcia, magnesia, ceria, alumina, and an oxide of a transition metal. Examples of the oxide of a transition metal include zirconia, yttria, niobium oxide, titania, chromium oxide, manganese oxide, iron oxide, copper oxide, cobalt oxide, and chromium oxide.

The crystalline inorganic material may also include oxides containing zirconia, for example, yttria-stabilized zirconia, CaO-stabilized zirconia, MgO-stabilized zirconia, zircon, CeO-stabilized zirconia, etc.

The crystalline inorganic materials in the insulation layer 36 can improve heat resistance and mechanical characteristics of the insulation layer 36.

In the case where the insulation layer 36 contains particles of the crystalline inorganic material, the average particle size of the particles of the crystalline inorganic material is preferably 0.1 to 50 μm, more preferably 0.1 μm or more and less than 10 μm.

If the average particle size of the particles of the crystalline inorganic material is in the range of 0.1 to 50 μm, the surface area of the crystalline inorganic material in a melting layer will be in an adequate range when the melting layer is formed by applying a raw material to the surface of the inner tube 34 and heating. Thus, the viscosity of a coating layer in a molten state will be maintained in an appropriate range without becoming too low, and the insulation layer 36 having a uniform thickness can be formed.

If the average particle size of the particles of the crystalline inorganic material in the insulation layer 36 is less than 0.1 μm, the surface area of the particles of the crystalline inorganic material in the melting layer will be too large because the particle size of the crystalline inorganic material particles is too small, excessively increasing the viscosity of the melting layer containing the particles of the crystalline inorganic material. Thus, the insulation layer 36 having a uniform thickness cannot be formed.

In contrast, if the average particle size of the particles of the crystalline inorganic material is more than 50 μm, the surface area of the particles of the crystalline inorganic material in the melting layer will be too small because the particle size of the crystalline inorganic material particles is too large, reducing the viscosity of the melting layer containing the particles of the crystalline inorganic material. Thus, the resulting melting layer will easily flow, and the insulation layer 36 to be formed will be thin.

In the case where the insulation layer 36 contains the crystalline inorganic material, the proportion of the crystalline inorganic material is preferably 5 to 70% by weight, more preferably 20 to 70% by weight, relative to the entire insulation layer 36.

If the proportion of the crystalline inorganic material is in the range of 5 to 70% by weight relative to the entire insulation layer 36, the weight proportion of the crystalline inorganic material in the melting layer will be in an adequate range when the melting layer is formed by applying a raw material composition to the surface of the inner tube 34 and heating. Thus, the viscosity of a coating layer in a molten state will be maintained in an appropriate range without becoming too low, and the insulation layer 36 having a uniform thickness can be formed.

In the electrically heated catalytic converter 10 of the present invention, a preferred lower limit of the thickness of the inner tube 34 is 0.8 mm, and a more preferred lower limit thereof is 1.2 mm. A preferred upper limit thereof is 3 mm, and a more preferred upper limit thereof is 2 mm.

The inner tube 34 having a thickness of less than 0.8 mm does not have sufficient strength. The inner tube 34 having a thickness of more than 3 mm cannot be easily formed into a specific shape.

In the electrically heated catalytic converter 10 shown in FIGS. 1(*a*) and 1(*b*), the first curved portion 34*a* of the inner tube 34 is curved so as to outwardly project, and the curvature radius of the first curved portion 34*a* is preferably 5 to 15 mm.

In the electrically heated catalytic converter, the thickness of the insulation layer 36 in the first curved portion 34*a* is preferably equal to or greater than one time to less than 1.4 times the thickness of the insulation layer 36 in other portions.

If the thickness of the insulation layer 36 in the first curved portion 34*a* is less than one time the thickness of the insulation layer 36 in other portions, insulation will be insufficient because the insulation layer is thin, and a short circuit may occur between the inner tube 34 and the catalyst carrier 20. In addition, the strength of the insulation layer is likely to be insufficient, making the insulation layer susceptible to damage by external shock.

If the thickness of the insulation layer 36 in the first curved portion 34*a* is equal to or greater than 1.4 times the thickness of the insulation layer 36 in other portions, thermal stress will not be easily alleviated, and the insulation layer will be susceptible to cracking and peeling due to internal thermal stress.

The electrically heated catalytic converter 10 of the present invention includes the catalyst carrier 20. The catalyst carrier 20 includes a ceramic honeycomb structured body formed from porous ceramic or the like. Exhaust gas flows into through holes, each of which is opened at both end faces on the exhaust gas inlet side and the exhaust gas outlet side, and the exhaust gas is purified by the action of the catalyst carried on a partition wall separating the through holes from each other.

The catalyst carrier 20 constituting the electrically heated catalytic converter 10 of the present invention is configured to generate heat by energization, and is formed using a ceramic material having a specific resistance, such as silicon carbide.

Fired bodies of such porous materials are brittle and thus easily broken by mechanical shock or the like. However, in the electrically heated catalytic converter 10 of the present invention, the electrical insulation mat 40 is disposed around the lateral side of the catalyst carrier 20 to absorb shock, making it possible to prevent cracking and the like in the catalyst carrier 20 resulting from mechanical shock and thermal shock.

Preferably, the electrical insulation mat 40 constituting the electrically heated catalytic converter 10 of the present invention is a mat containing inorganic fibers. The inorganic fibers constituting the mat are not particularly limited, and may be alumina-silica fibers, alumina fibers, silica fibers, or the like. Alternatively, glass fibers or biosoluble fibers may be used. The kind of inorganic fibers may be changed, for example, in accordance with characteristics (such as heat resistance and resistance to wind-induced erosion) required of the mat. It is preferred to use fibers having a diameter and a length conformable to environmental regulations of individual countries.

Figure 2:
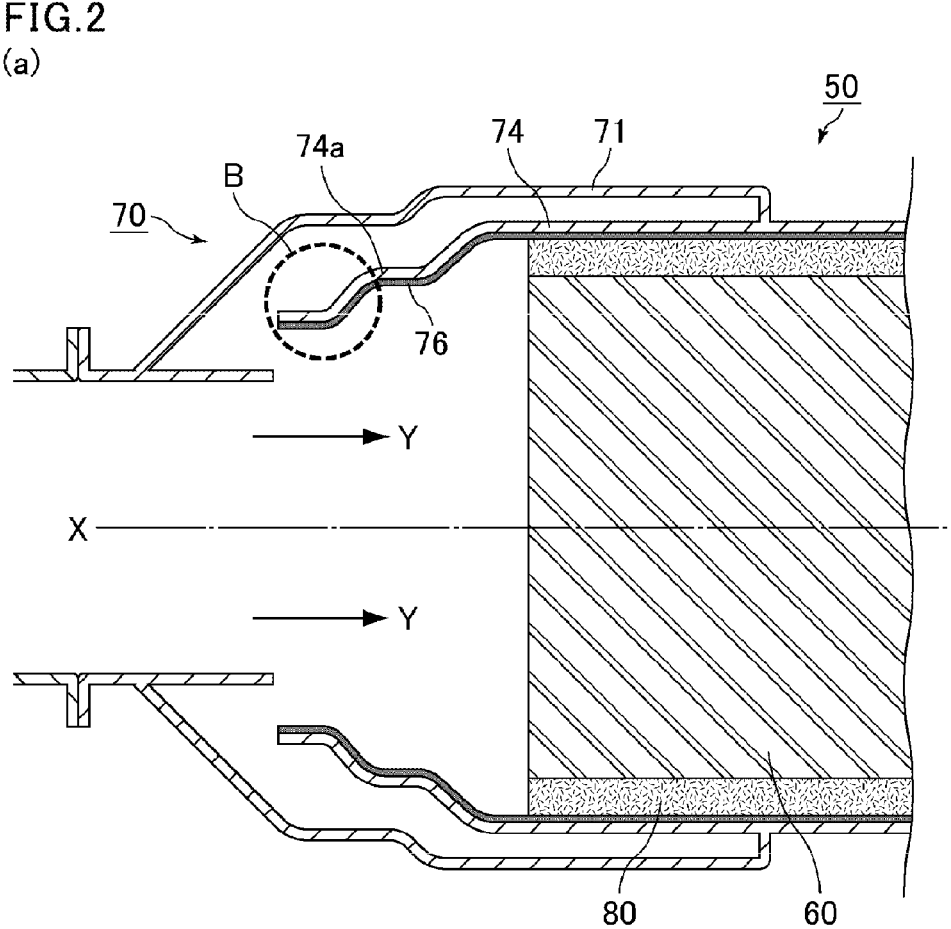
FIG. 2(a) is a cross-sectional view schematically showing another example of the electrically heated catalytic converter according to the present invention.
FIG. 2(b) is a cross-sectional view showing a region B at an end portion of an inner tube constituting the electrically heated catalytic converter.
Figure 2:
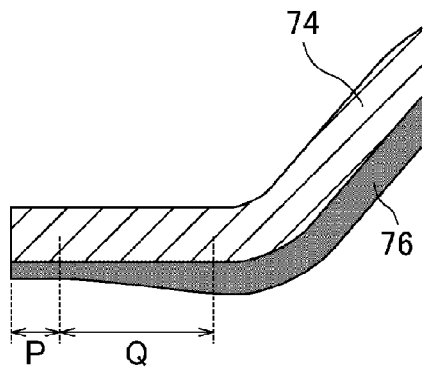
Figure 3:
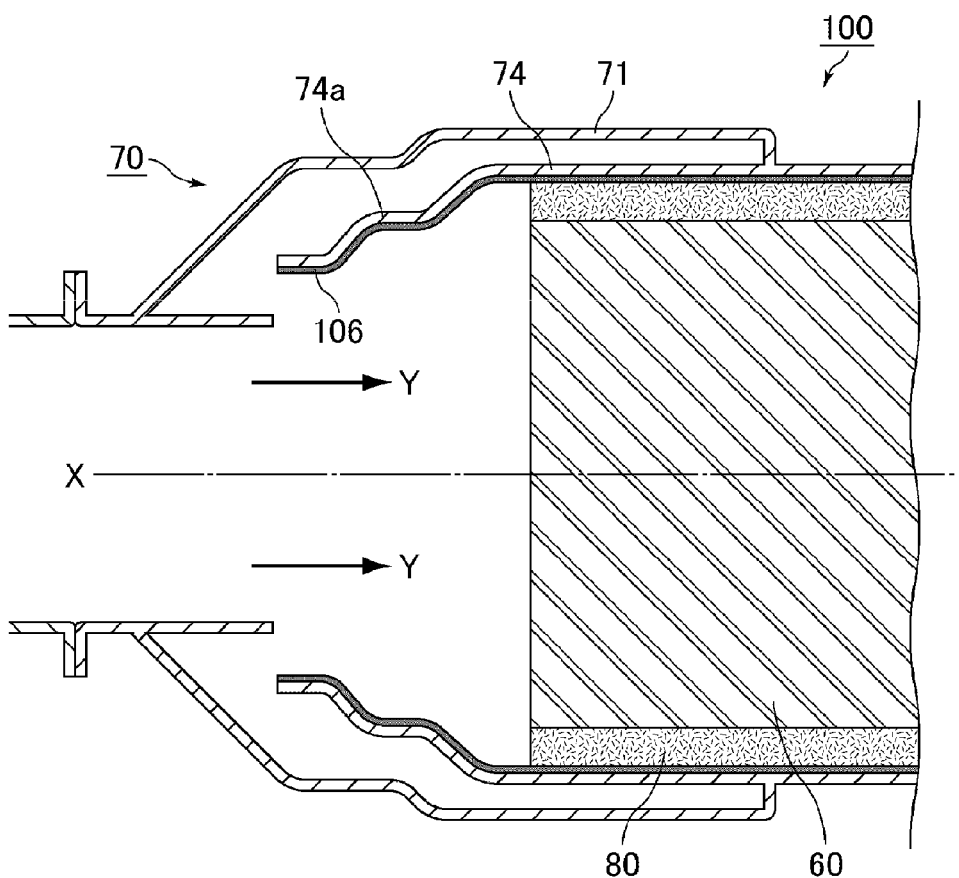
FIG. 3 is a cross-sectional view schematically showing a catalytic converter disclosed in Patent Literature 1.

FIG. 2(*a*) is a cross-sectional view schematically showing another example of the electrically heated catalytic converter according to the present invention. FIG. 2(*b*) is a cross-sectional view showing a region B at an end portion of an inner tube constituting the electrically heated catalytic converter.

An electrically heated catalytic converter 50 shown in FIGS. 2(*a*) and 2(*b*) has the same structure as the catalytic converter disclosed in Patent Literature 1, and includes a catalyst carrier 60 as a heating element, a case 70 for accommodating the catalyst carrier 60, and an insulation mat 80 disposed between the case 70 and the catalyst carrier 60. The case 70 includes an outer tube 71 serving as an external partition wall, and an inner tube 74 disposed inside the outer tube 71. The inner tube 74 includes an insulation layer 76 to prevent a short circuit between the inner tube 74 and the catalyst carrier 60.

The inner tube 74 is curved once so as to outwardly project, and then obliquely extends toward the central axis of the case. The inner tube 74 is again curved in the middle so as to outwardly project. As a result, the inner tube 74 is curved twice so as to project toward the central axis.

Thus, the inner tube 74 is curved twice so as to outwardly project and is curved twice so as to project toward the central axis.

Also in this electrically heated catalytic converter 50, the end portion of the inner tube 74 is often exposed to high temperature exhaust gas, and the temperature of the end portion becomes higher than that of other portions. This results in a large temperature gradient in a first end region P (i.e., a region in the range from the end portion of the inner tube to 10% of the length of the inner tube from the end portion of the inner tube to the end of the catalyst carrier), and a second end region Q (i.e., a region in the range from a point immediately after 10% of the length away from the end portion of the inner tube to 50% of the length of the inner tube from the end portion of the inner tube to the end of the catalyst carrier) (see FIG. 2(*b*)).

Thus, as shown in FIG. 2(*b*), the insulation layer 76 having a thickness of 100 to 200 μm is formed on the first end region P, and the insulation layer 76 having a thickness of 100 to 400 μm which is thicker than the insulation layer 76 in the first end region P is formed on the second end region Q to prevent cracking and peeling in the insulation layer.

The thickness of the insulation layer 76 in regions other than the first end region P and the second end region Q is not particularly limited. In the portions where the inner tube 74 is curved so as to outwardly project, the thickness of the insulation layer 76 is preferably equal to or greater than one time to less than 1.4 times the thickness of the insulation layer 76 in other portions.

The electrically heated catalytic converter 50 shown in FIGS. 2(*a*) and 2(*b*) has the same structure as the electrically heated catalytic converter shown in FIGS. 1(*a*) and 1(*b*), except for the portions described above. Thus, a detailed description thereof is omitted.

The following description is given of a method for forming the insulation layer in the inner tube constituting the electrically heated catalytic converter of the present invention.

A raw material composition for forming the insulation layer contains particles of only amorphous inorganic material or contains particles of both amorphous inorganic material and crystalline inorganic material. The raw material composition may also contain a dispersion medium, an organic binder, and the like.

In the case where the raw material composition for forming the insulation layer contains a crystalline inorganic material, as described above, the weight proportion of the crystalline inorganic material is preferably 5 to 70% by weight, more preferably 20 to 70% by weight, relative to the total amount of the amorphous inorganic material and the crystalline inorganic material. In this case, the average particle size of the particles of the crystalline inorganic material is preferably 0.1 to 50 μm.

When the amorphous inorganic material in the raw material composition is applied to the surface of the inner tube and heated, the amorphous inorganic material is melted and a layer of the amorphous inorganic material is formed. Thus, there is no need to strictly control the particle size of the amorphous inorganic material; however, in the case where the raw material composition contains the crystalline inorganic material, the particles of the amorphous inorganic material must be uniformly dispersed in the raw material composition for forming the insulation layer.

In this aspect, the average particle size of the particles of the amorphous inorganic material in the raw material composition is preferably 0.1 to 100 μm, more preferably 1 to 20 μm. The particles having an average particle size in the range of 1 to 20 μm, which are presumably less affected by electrostatic charge on the particle surface, can be easily uniformly dispersed.

Examples of the dispersion medium include water and organic solvents such as methanol, ethanol, and acetone. The ratio of a powder of the amorphous inorganic material to the dispersion medium to be contained in the raw material composition is not particularly limited. For example, the amount of the dispersion medium is preferably 50 to 150 parts by weight relative to the 100 parts by weight of the powder of the amorphous inorganic material, so that the raw material composition will have a viscosity suitable for application to the inner tube.

Examples of organic binders that can be added to the raw material composition for forming the insulation layer include polyvinyl alcohol, methyl cellulose, ethyl cellulose, and carboxymethyl cellulose. These may be used alone or in combination of two or more thereof. The dispersion medium and the organic binder can be used together.

The following description is given on specific steps for forming the insulation layer in the inner tube.

(1) Inner Tube Pretreatment Step

First, it is preferred to perform washing treatment to remove impurities from the surface of the inner tube.

The washing treatment is not particularly limited, and any conventionally known washing treatment can be used. Specific examples include methods such as ultrasonic cleaning in an alcohol solvent.

In addition, after the washing treatment, roughening treatment may be performed on the surface of the inner tube, if necessary, in order to increase the specific surface area of the inner tube or to adjust the roughness of the surface of the inner tube. Specific examples of roughening treatment include sandblasting treatment, etching treatment, and high temperature oxidation treatment. These treatments may be used alone or in combination of two or more thereof. Additional washing treatment may be performed after the roughening treatment.

(2) Step of Forming the Insulation Layer in the Inner Tube

First, an amorphous inorganic material, an organic binder, a dispersion medium, and the like are mixed to prepare a raw material composition for forming the insulation layer. Particles of a crystalline inorganic material may be added, if necessary.

Specifically, for example, a powder of an amorphous inorganic material and a powder of a crystalline inorganic material that is added if necessary are prepared to have a specific particle size, a specific shape, and the like. Then, these powders are dry-mixed at a specific ratio to prepare a powder mixture. Further, water, an organic binder, and the like are added to and wet-mixed with the powder mixture in a ball mill. Thus, a raw material composition for forming the insulation layer is prepared.

The ratio of water to a powder of an amorphous inorganic material and the like is not particularly limited. Yet, the amount of water is preferably about 100 parts by weight relative to 100 parts by weight of a powder of an amorphous inorganic material and the like, so that the raw material composition will have a viscosity suitable for application to the inner tube. As described above, a dispersion medium and the like (for example, an organic solvent) may also be added to the raw material composition for forming the insulation layer, if necessary.

(3) Next, the raw material composition for forming the insulation layer is applied to the surface of the inner tube.

The raw material composition can be applied by a method such as spray coating, electrostatic coating, ink-jet printing, transfer (transfer using a stamp, a roller, or the like), brushing, or electrodeposition coating.

In order to form an insulation layer in the first end region and the second end region of the inner tube in such a manner that the thickness of the insulation layer is thinner than that in other regions, preferably, the first end region of the inner tube is first covered with a mask, and the first application is performed on the first end region and the second end region of the inner tube; and the mask is then removed and the second application is performed on the first end region and the second end region of the inner tube.

(4) Subsequently, heat treatment is performed on the inner tube in which a coating film for the insulation layer is formed.

Specifically, the insulation layer is formed by first drying the inner tube to which the raw material composition has been applied and then heating.

The heating temperature is preferably equal to or higher than the softening point of the amorphous inorganic material. The heating temperature is preferably 700° C. to 1100° C., although it depends on the kind of amorphous inorganic material. The heating temperature is preferably equal to or higher than the softening point of the amorphous inorganic material because it makes it possible to achieve strong adhesion between the inner tube and the amorphous inorganic material and to form an insulation layer that is strongly adhered to the inner tube.

The effects of the electrically heated catalytic converter of the present invention are listed below.

(1) In the electrically heated catalytic converter of the present invention, the end portion of the inner tube is heated to a high temperature, which results in a large temperature gradient in the first end region. The temperature gradient causes high thermal stress in the insulation layer formed on the first end region. Yet, it is possible to alleviate the stress in the first end region, which is heated to a high temperature, and to also alleviate the thermal stress in the insulation layer by making the insulation layer formed on the first end region thinner than the insulation layer formed in the second end region. In addition, it is possible to minimize the occurrence of stress by making the insulation layer in the first end region as thin as possible (100 to 200 μm) without impairing insulation, thus preventing cracking and peeling in the insulation layer.

Further, in the second end region where the insulation layer having a thickness of 100 to 400 μm which is thicker than the insulation layer in the first end region is formed, the temperature gradient is smaller than that in the first end region. Thus, even if high thermal stress occurs in the second end region due to the temperature gradient, the insulation layer will be less susceptible to cracking and peeling.

(2) In the electrically heated catalytic converter of the present invention, the insulation layer having a thickness of 100 to 400 μm is formed on the inner tube. Thus, it is possible to provide sufficient insulation and prevent a short circuit between the inner tube and the catalyst carrier.

(3) In the electrically heated catalytic converter of the present invention, in the case where the amorphous inorganic material is formed of low softening point glass having a softening point of 300° C. to 1000° C., it is possible to relatively easily form the insulation layer by forming a coating layer on the surface of the inner tube by means of application or the like and then heating.

(4) In the electrically heated catalytic converter, in the case where the insulation layer contains a crystalline inorganic material in the layer of the amorphous inorganic material, it is possible to improve the heat resistance of the insulation layer and to mechanically reinforce the insulation layer.

EXAMPLES

Examples that more specifically disclose the electrically heated catalytic converter of the present invention are described below. The present invention is not limited to these examples.

Example 1

(1) Provision of a Cylindrical Body

A stainless-steel (SUS 430) cylindrical body was provided. The shape of the cylindrical body was substantially the same as that of the inner tube 34 shown in FIGS. 1(a) and 1(b); and in a cross section taken along a plane including the central axis, the cylindrical body included a first curved portion and a second curved portion. The first curved portion was curved so as to outwardly project, and the second curved portion was curved in the direction opposite to the curvature of the first curved portion so as to project toward the central axis. In the cylindrical body, the diameter of a portion having a largest diameter was 105 mm, the diameter of a portion having a smallest diameter was 60 mm, the thickness was 1.5 mm, and the smallest curvature radii of the first curved portion and the second curved portion were as shown in Table 1. This cylindrical body was washed by ultrasonic cleaning in an alcohol solvent.

Next, sandblasting treatment was performed to roughen the inner side of the cylindrical body. The sandblasting treatment was performed using #100 $Al_2O_3$ abrasive grains for 10 minutes.

The surface roughness on the inner side of the cylindrical body was measured using a surface roughness meter (Handy Surf E-35B, Tokyo Seimitsu Co., Ltd.), with a measurement distance of 10 mm. As a result, the surface roughness on the inner side of the cylindrical body had $Rz_{JIS}$ of 5 μm.

(2) Preparation of the Raw Material Composition for Forming the Insulation Layer Barium silicate glass (softening point of 770° C.) was provided as a powder of the amorphous inorganic material. The concentration of the amorphous inorganic material was 51% by weight relative to the entire raw material composition. The term "concentration" refers to the proportion in percentage of the amorphous inorganic material relative to the total amount of the raw material composition for forming the insulation layer including water and the like.

In addition, methyl cellulose was provided as an organic binder, and added in such a manner that its concentration would be 5% by weight relative to the entire raw material composition for forming the insulation layer.

For preparation of the raw material composition for forming the insulation layer, water was also added in such a manner that the proportion of water would be 100 parts by weight relative to 100 parts by weight of the powder of the amorphous inorganic material, and particles of α-alumina (average particle size: 10 μm) were also added in an amount of 15 parts by weight. These components were wet-mixed in a ball mill. Thus, a raw material composition was obtained.

The average particle size of the α-alumina particles was determined using a laser diffraction particle size analyzer (SALD-300V, Shimadzu Corporation).

(3) Formation of the Insulation Layer

The prepared raw material composition was applied to the inner side of the cylindrical body by a spray coating method, and dried in a drying apparatus at 100° C. for 60 minutes. In application by the spray coating method, in order to make the insulation layer 36 thin in the first end region and the second end region, the first end region of the inner tube was first covered with a mask, and the first application was performed on the first end region and the second end region of the inner tube; and the mask was then removed and the second application was performed on the first end region and the second end region of the inner tube.

Subsequently, heat treatment was performed at 820° C. for 180 minutes to form an insulation layer on the inner side of the cylindrical body. Evaluation was performed as described below.

Example 2 and Comparative Examples 1 to 4

An insulation layer was formed on the inner side of a cylindrical body in the same manner as in Example 1 except for using a cylindrical body in which the thickness of the insulation layer 36 in the first end region and the second end region was changed as shown in Table 1. Evaluation was performed as described below.

Evaluation of the Cylindrical Body in which the Insulation Layer was Formed
(Measurement of the Layer Thickness)

The thickness of each insulation layer formed on the inner side of the cylindrical bodies obtained in Examples 1 and 2 and Comparative Examples 1 to 4 was measured with Dual Scope MP40 (Fischer Instruments K.K.).

Table 1 shows the thickness of the insulation layer 36 in the first end region and the second end region of the inner tube 34, as measured in the manner described above.

(Evaluation of Initial Insulation of the Insulation Layer)

In each of the cylindrical bodies obtained in Examples 1 and 2 and Comparative Examples 1 to 4, Cu particles were applied to the surface of the insulation layer 36 by sputtering, and a pair of electrodes was placed on the surface of the insulation layer 36 and the outer surface of each cylindrical body. Next, a voltage of 500 V was applied across the pair of electrodes, and the resistance between the surface of the insulation layer 36 and the outer surface of the cylindrical body was measured using a resistance meter. The resistance meter was Digital Ultra-High Resistance/Micro Current Meter (R8340, Advantest Corporation). With respect to the insulation layer 36 having a thickness of 100 μm or more, if the resistance between the surface of the insulation layer 36 and the outer surface of the cylindrical body was $4.0 \times 10^4 \Omega$ or higher, the insulation layer 36 was evaluated as having insulation and indicated by A; and if the resistance was lower than $4.0 \times 10^4 \Omega$, the insulation layer 36 was evaluated as not having insulation and indicated by B. Table 1 shows the results.

(Evaluation of Durability by Thermal Test)

The cylindrical bodies obtained in Examples 1 and 2 and Comparative Examples 1 to 4 were heated to 800° C. In this state, each cylindrical body was placed on a room-temperature, thick metal plate, and was naturally cooled to 150° C. in five minutes. Subsequently, the cylindrical bodies were collected, and the conditions of the insulation layers were visually observed to check for cracking and peeling. Table 1 shows the results. In Table 1, the cylindrical bodies without defects such as cracking and peeling were indicated by A; and the cylindrical bodies with defects such as cracking and peeling were indicated by B.

TABLE 1

| | Thickness of the insulation layer in the first end region (μm) | Thickness of the insulation layer in the second end region (μm) | Initial insulation | Peeling and cracking after thermal test |
|---|---|---|---|---|
| Example 1 | 195 | 200 | A | A |
| Example 2 | 200 | 300 | A | A |

TABLE 1-continued

| | Thickness of the insulation layer in the first end region (μm) | Thickness of the insulation layer in the second end region (μm) | Initial insulation | Peeling and cracking after thermal test |
|---|---|---|---|---|
| Comparative Example 1 | 90 | 100 | B | A |
| Comparative Example 2 | 300 | 400 | A | B |
| Comparative Example 3 | 150 | 90 | B | A |
| Comparative Example 4 | 150 | 420 | A | B |

As shown in Table 1, in the cylindrical bodies according to Examples 1 and 2, the thickness of the insulation layer 36 in the first end region was adjusted to 195 μm (Example 1) and 200 μm (Example 2). The thickness of the insulation layer 36 in the second end region was adjusted to 200 μm (Example 1) and 300 μm (Example 2). The thickness of the insulation layer in the first end region and the thickness of the insulation layer in the second end region were in the range of the present invention. Thus, these insulation layers exhibited good insulation, and defects such as peeling and cracking were not found after the thermal test. This clearly shows that an insulation layer excellent in insulation and durability without defects can be formed on the inner tube 34 shown in FIGS. 1(*a*) and 1(*b*).

In contrast, in the cylindrical bodies according to Comparative Examples 1 and 2, the thickness of the insulation layer 36 in the first end region was adjusted to 90 μm (Comparative Example 1) and 300 μm (Comparative Example 2). The thickness of the insulation layer 36 in the second end region was adjusted to 100 μm (Comparative Example 1) and 400 μm (Comparative Example 2). The thickness of the insulation layer in the first end region of each of the cylindrical bodies according to Comparative Examples 1 and 2 was outside the range of the present invention. Thus, the insulation layer formed in Comparative Example 1 was defective in terms of initial insulation, and the insulation layer formed in Comparative Example 2 exhibited peeling or cracking in the insulation layer after the thermal test. This clearly shows that the insulation layers formed in Comparative Examples 1 and 2 are defective in terms of insulation or durability.

In addition, in the cylindrical bodies according to Comparative Examples 3 and 4, the thickness of the insulation layer 36 in the first end region was adjusted to 150 μm (Comparative Example 3) and 150 μm (Comparative Example 4). The thickness of the insulation layer 36 in the second end region was adjusted to 90 μm (Comparative Example 3) and 420 μm (Comparative Example 4). The thickness of the insulation layer in the second end region of each of the cylindrical bodies according to Comparative Examples 3 and 4 was outside the range of the present invention. Thus, the insulation layer formed in Comparative Example 3 was defective in terms of initial insulation, and the insulation layer formed in Comparative Example 4 exhibited peeling or cracking in the insulation layer after the thermal test. This clearly shows that the insulation layers formed in Comparative Examples 3 and 4 are defective in terms of insulation or durability.

REFERENCE SIGNS LIST

10, 50 electrically heated catalytic converter
20, 60 catalyst carrier
30, 70 case
31, 71 outer tube
34, 74 inner tube
34*a* first curved portion
34*b* second curved portion
36, 76 insulation layer
40, 80 mat

The invention claimed is:

1. An electrically heated catalytic converter for purifying exhaust gas, the electrically heated catalytic converter comprising:
   a catalyst carrier supporting a catalyst and configured to generate heat by energization;
   a case for accommodating the catalyst carrier; and
   an electrical insulation mat interposed between the catalyst carrier and the case,
   wherein the case comprises an outer tube disposed at the outermost side and an inner tube disposed inside the outer tube;
   in a cross section upstream of the catalyst carrier taken along a plane including the central axis of the case,
   the inner tube is curved at least once so as to outwardly project and then obliquely extends toward the central axis of the case,
   an insulation layer having a thickness of 100 to 200 μm is formed in the range from an end portion of the inner tube to 10% of the length of the inner tube from the end portion of the inner tube to an end of the catalyst carrier,
   an insulation layer having a thickness of 100 to 400 μm is formed in the range from a point immediately after 10% of the length away from the end portion of the inner tube to 50% of the length of the inner tube from the end portion of the inner tube to the end of the catalyst carrier, and
   the insulation layer formed in the range from the end portion of the inner tube to 10% of the length is thinner than the insulation layer formed in the range from a point immediately after 10% of the length away from the end portion of the inner tube to 50% of the length.

2. The electrically heated catalytic converter according to claim 1,
   wherein the insulation layer is formed from an amorphous inorganic material.

3. The electrically heated catalytic converter according to claim 1,
   wherein the insulation layer further contains a crystalline inorganic material.

4. The electrically heated catalytic converter according to claim 2,
   wherein the amorphous inorganic material is formed of low softening point glass having a softening point of 300° C. to 1000° C.

5. The electrically heated catalytic converter according to claim 4,
   wherein the low softening point glass includes at least one of barium glass, boron glass, strontium glass, alumina silicate glass, soda-zinc glass, and soda-barium glass.

6. The electrically heated catalytic converter according to claim 3,
   wherein the crystalline inorganic material includes at least one of calcia, magnesia, ceria, alumina, and an oxide of a transition metal.

7. The electrically heated catalytic converter according to claim 1,
   wherein a portion of the surface of the inner tube where the insulation layer is to be formed is roughened.

* * * * *